Patented Dec. 29, 1936

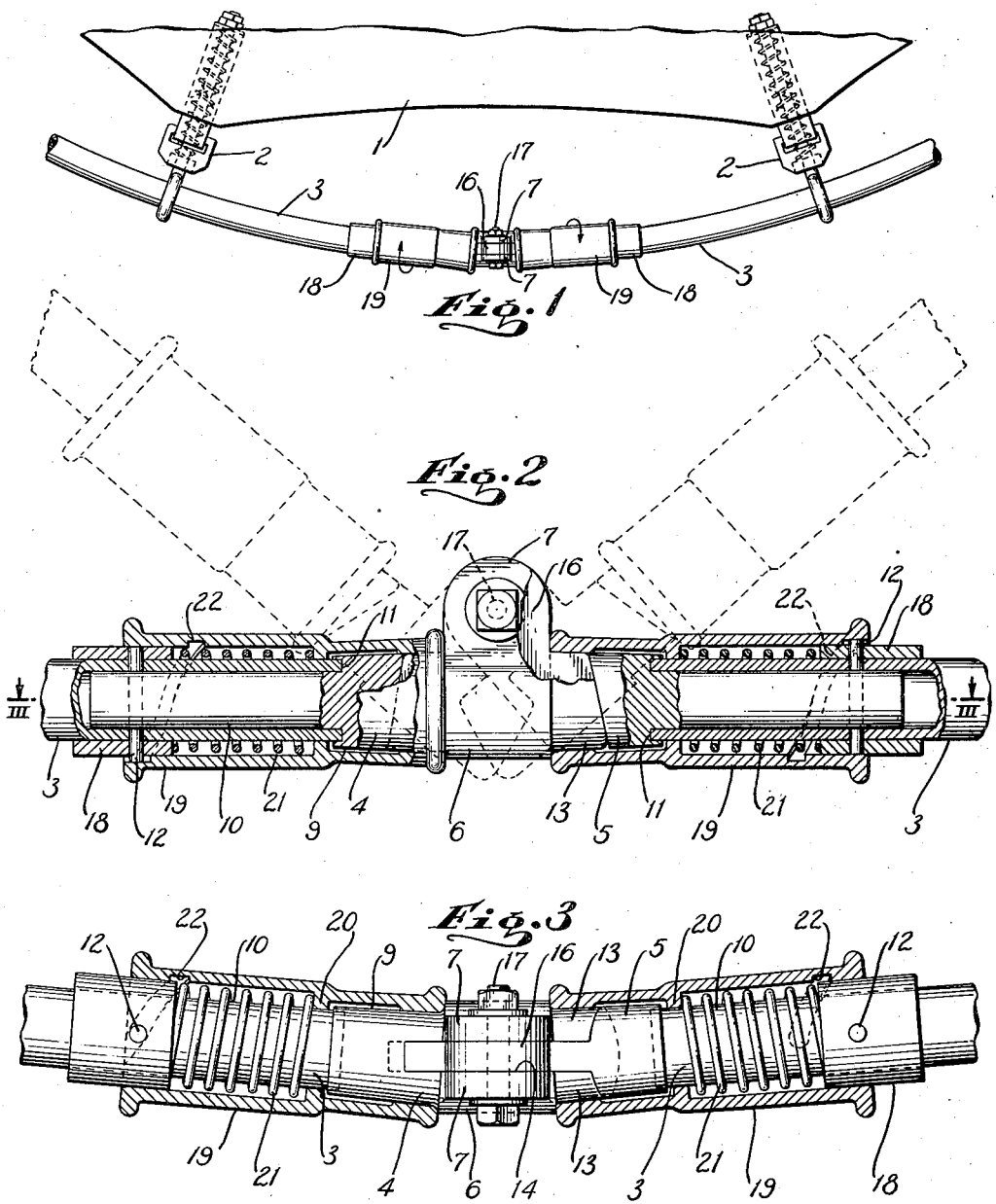

2,066,182

UNITED STATES PATENT OFFICE 2,066,182

LIFESAVING NET

Charles C. Lenz, Great Kills, Staten Island, N. Y.

Application February 5, 1936, Serial No. 62,410

7 Claims. (Cl. 227—46)

The invention relates to life saving nets of the so-called "Browder" type, comprising generally a canvas net yieldingly supported by a ring frame adapted to be held by firemen to receive persons obliged to jump from burning buildings. In use such nets are subjected to enormous strains and, being therefore required to be of great strength (and usually of a diameter of some nine feet) are heavy and cumbersome to transport and, in consequence, are usually adapted to be folded, either in halves or quarters, the folding being permitted by making the ring or frame in sections which are hinged together. The present invention particularly concerns the hinge joints for such sections, having for its objects the elimination of certain weaknesses inherent in prior constructions and the provision of a joint which is rugged, which is not liable to derangement and which is simple and safe to manipulate, all as described more fully below by reference to the accompanying drawing in which:

Fig. 1 is a plan view of the joint, showing a portion of a life net of the type referred to;

Fig. 2 is an enlarged section of the joint, the broken position of which is indicated in dotted lines, and Fig. 3 is a section on the line III—III of Fig. 2.

In Fig. 1 the canvas net is marked 1 and the reference 2 indicates generally the spring supports by which the net is secured to the frame 3. The latter comprises pipe sections bent to circular form, there being two or four sections depending on whether the net is to be foldable in halves or quarters, as will be understood. Since they are all of identical construction only one joint is shown.

According to my invention the end portions of the pipe sections, throughout a relatively short distance, are straight, as shown in Fig. 3 and are united by a hinge joint comprising essentially two members, indicated at large by the reference characters 4 and 5.

The member 4 comprises a central portion 6 from which protrudes laterally the spaced hinge lugs 7. From the ends of the portion 6 extend integral plug portions each of which is set at an angle to the axis of the central portion (Fig. 3). One of these plug portions comprises a head 9, of conical section and a reduced shank 10 adapted to fit within the adjacent pipe section (Fig. 2); in the end face of the head is a recess 11 to receive the pipe. The pipe and shank may thus be rigidly secured together, as by a pin 12. The other plug portion, marked 13, is likewise of conical section but is relatively short (Fig. 2). Both plug portions are intersected, at an angle to their axes, by a slot, which is straight throughout its length and which is an extension of the slot or space 14 between hinge lugs 7.

The other member of the joint, marked 5, comprises a head of conical section complementary to plug 13 and forming with it a head identical to head 9, having a similar recess 11 to receive the end of the adjacent pipe section and also a reduced shank 10 fitting the pipe and secured to it by a corresponding pin 12. Member 5 has projecting from it a tongue 15 set at an appropriate angle to the axis of member 5 and so shaped as to fit slot 14 and also to provide a hinge lug 16 complementary to lugs 7, through all of which lugs passes a hinge bolt 17. As indicated, the engaging end faces of the tongue and slot, and of plugs 13 and 5 are bevelled, so as to limit the relative movement of the joint members and ensure their alignment when the sections are brought from the dotted to the full line positions indicated in Fig. 2.

As shown, each of the pins 12 which secures the pipe sections to the hinge members, serves also to secure a collar 18 upon which slides one end of a hand-grip locking sleeve 19. The interior of the other end of each sleeve is tapered so that when the inner ends of the sleeves abut the hinge lugs, they closely fit the tapered plug portions and tongue 16 and rigidly hold the joint closed. At the same time the sleeves constitute convenient hand grips so that they may be readily drawn back to permit the joint to be broken, the taper facilitating the disengagement of the parts as well as ensuring a tight locking of the same when in engaging position.

The interior of each sleeve has a flange 20 which provides a bearing for the sleeve on the pipe section and serves also as a bearing for the end of a spring 21 by which the sleeve is urged toward its locking position; the other end of the spring bears against collar 18. Being thus journalled on collar 18 at one end and, intermediate its length, on the straight end of the pipe section, the sleeve is capable of being freely operated without danger of jamming and, at the same time, the springs 21 are effectively enclosed and the possibility of the hand of the operator being pinched by any of the parts is reduced to a minimum.

In the preferred form illustrated, the locking sleeves are so arranged that they may be withdrawn by merely rotating them, to which end pins 12 are extended beyond collars 18 to engage quick-threads 22 formed on the interior of the sleeves. As indicated, the threads are both of the same cut (either right or left hand) with the result that the sleeves, grasped one in each hand of the operator, are positively withdrawn by rotating them one in one direction and one in the other, as indicated by the arrows in Fig. 1.

I claim:

1. In a life net having pipe sections bent to circular form and terminating in straight end portions; connecting means for said sections comprising two members; one of said members having a central hinge portion and plug portions integral therewith and extending one from each end thereof at an angle to the axis of the central portion, one of said plug portions having an extension adapted to enter the straight end portion of one of the pipe sections, and a straight slot extending through said central portion throughout the length thereof and into said plug portions; the other of said members having a plug portion adapted to enter the straight end portion of the other of said pipe sections and a straight tongue projecting from such plug portion at an angle thereto and adapted to enter and fit said slot; said central hinge portion and said tongue having overlapping lugs and a hinge pin passing therethrough, means for securing the said plug portions to the respective pipe sections and releasable means for locking the said tongue and slot in engagement.

2. The combination set forth in claim 1, in which each of the plug portions adapted to enter the pipe sections has an enlarged head having a recess therein to receive the pipe end.

3. The combination set forth in claim 1, in which each of the said integral plug portions is of conical section adjacent its junction with the said central portion, for the purpose described.

4. In a hinge joint of the character described, the combination with a pipe section bent to circular form and terminating in a straight end portion, a plug having a head and an extension adapted to enter the pipe, said head being of greater diameter than the pipe and adapted to form a stop against which the end of the pipe abuts, a collar encircling the pipe and a pin securing the collar and the said extension to the pipe, a hand grip comprising a sleeve slidably mounted at one end on said collar and adapted to enclose said head, a spring mounted within the sleeve and bearing at one end against said collar, and a flange on the interior of the sleeve against which bears the other end of said spring, said flange also adapted to furnish a bearing for the sleeve on the pipe.

5. The combination set forth in claim 4, in which the interior of said sleeve at the end thereof remote from said collar is tapered, for the purpose described.

6. In a hinge joint of the character described, the combination with a pipe section bent to circular form and terminating in a straight end portion, a plug having a head and an extension adapted to enter the pipe, a hand-grip comprising a sleeve engageable with said head and journalled at one end, and intermediate its ends, for longitudinal movement on the pipe, and a spring enclosed between the sleeve and pipe and adapted to urge the former into engagement with said head, for the purpose described.

7. In a hinge joint, the combination as claimed in claim 6 in which said hand-grip sleeve has a quick thread formed on the interior thereof and is adapted to be engaged by a pin member secured to the pipe, for the purpose described.

CHARLES C. LENZ.